Feb. 5, 1957
H. J. MORAN
2,780,428
PARACHUTE CONTAINER
Filed Nov. 23, 1954
2 Sheets-Sheet 1
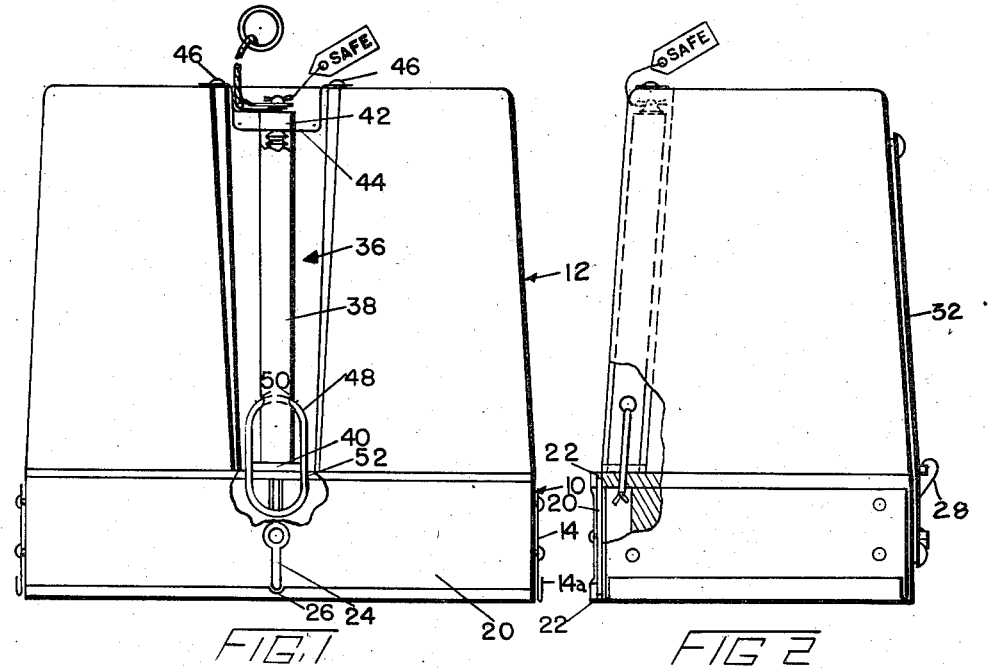
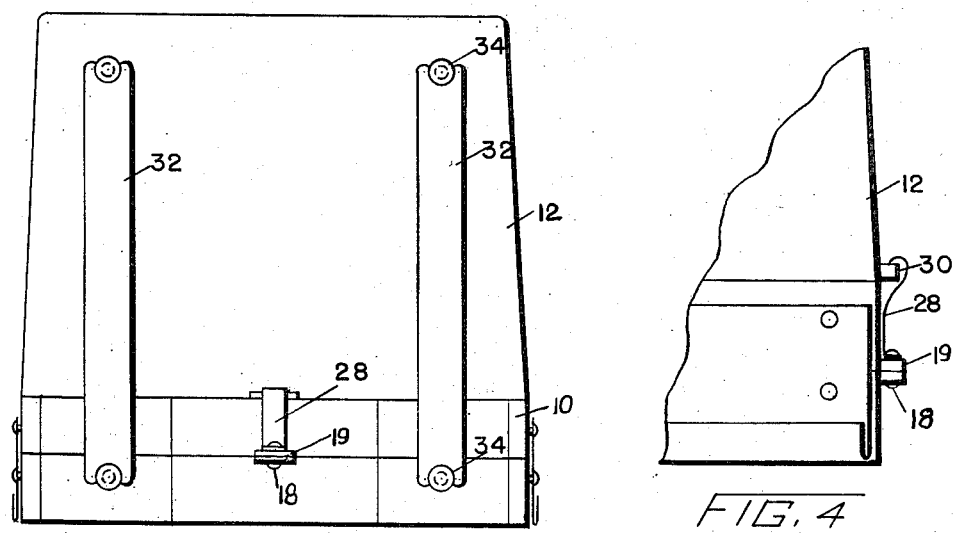
INVENTOR.
HAROLD J. MORAN
BY
CURTIS, MORRIS & SAFFORD
ATTY'S.

Feb. 5, 1957   H. J. MORAN   2,780,428
PARACHUTE CONTAINER
Filed Nov. 23, 1954   2 Sheets-Sheet 2
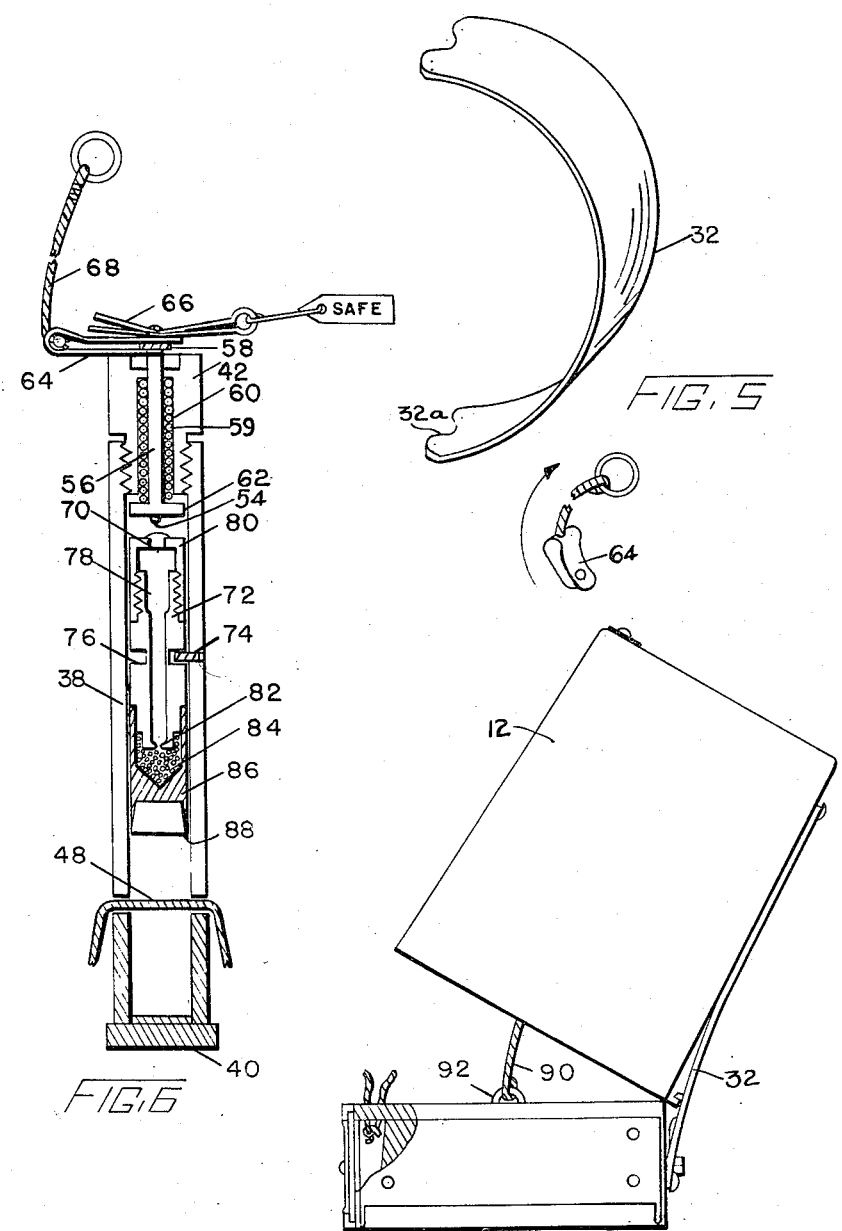
INVENTOR.
HAROLD J. MORAN
BY
CURTIS, MORRIS & SAFFORD
ATTY'S.

United States Patent Office 2,780,428
Patented Feb. 5, 1957

2,780,428
PARACHUTE CONTAINER

Harold J. Moran, Trenton, N. J., assignor to Switlik Parachute Company, Inc., Trenton, N. J.

Application November 23, 1954, Serial No. 470,633

3 Claims. (Cl. 244—149)

This invention relates to delayed opening parachute packs of the general type used in dropping equipment from rapidly moving aircraft.

U. S. Patent No. 2,582,113, issued January 8, 1952, discloses a delayed opening parachute pack of the type which has been commonly employed in dropping from high flying aircraft radio weather equipment adapted to transmit radio signals in accordance with such variables as barometric pressure, temperature, wind velocity and humidity encountered during descent of the parachute. This equipment is utilized in the arctic and in other regions where there are no ground meteorological stations, to transmit weather information which, for example, is invaluable in charting transoceanic airplane flights.

Such packs are dropped from pressure-tight compartments in the bottom of the aircraft fuselage. The packs are equipped with a time-delay device to open the parachutes a fixed time interval after they are dropped in order to allow the packs to clear the aircraft tail empennage and to decelerate sufficiently to prevent the opening shock from damaging the delicate radio equipment.

In actual use, the parachute pack disclosed in said Patent No. 2,582,113 has been found subject to a number of disadvantages. For one thing, a pair of elastic cords is employed to open the pack. At the high altitudes and extreme latitudes at which such equipment is most usually employed, extremely low temperatures are encountered, and these low temperatures frequently resulted in destroying the elasticity of the elastic cords and rendering the pack inoperative. In long term storage, moreover, the elastic cords were subject to serious deterioration and frequently either broke or lost their elasticity.

Certain previous types of parachute packs were normally held closed by a string which was tensioned by means of a piece of elastic, the string being severed to open the pack and release the parachute. In the use of such packs, it has been found that in many instances the string upon being severed would be flipped beneath the elastic cords or some other projecting part of the pack and become snarled to prevent proper opening of the pack.

In certain other previous types of parachute pack, the elastic cords were attached to bosses projecting from one side of the container, in order to give the cords a lateral component of pulling force and facilitate pivotal opening movement of the cover of the pack. These bosses not only rendered the packs asymmetrical, so that they would fit into the pressure lock compartment only one way, but also increased the likelihood that the pack would become fouled and fail to drop properly from the airplane. The previous packs were comparatively expensive to manufacture, involving a great deal of hand work, for example in making the elastic cords and in tieing them properly on the pack. Since such equipment is not normally recovered after it is dropped, but is considered expendable, it is of course important to keep its cost at a minimum.

It is therefore among the objects of the present invention to provide a parachute pack of the general type described which is without the aforementioned disadvantages of previous packs. It is a further object of this invention to provide a parachute pack which is simple and inexpensive to manufacture, which is generally symmetrical in contour and relatively free of surface projection which might cause fouling, and which is perfectly reliable in operation. This, and other objects apparent hereinafter, are achieved by the apparatus described herein and shown in the accompanying drawings, in which:

Figure 1 is a front elevational view of a parachute pack embodying features of the present invention.

Figure 2 is a side elevational view of the pack shown in Figure 1, partially broken away to reveal its construction.

Figure 3 is a rear elevational view of the pack.

Figure 4 is an enlarged fragmentary side elevational view showing in detail the link member at the rear center of the pack.

Figure 5 is a perspective view of one of the spring members of the pack, showing its shape when relaxed.

Figure 6 is a longitudinal sectional view at enlarged scale through the time delay mechanism of the pack.

Figure 7 is a view similar to Figure 2, but showing the pack in the process of opening.

As may be seen in Figures 1, 2 and 3, the parachute pack provided by the present invention generally includes a container 16 formed by a rectangular base 10 and a hollow, box-like cover or shell 12 thereon. The base 10 is in the form of a shallow rectangular box, and is adapted to house batteries for supplying electrical power to radio equipment located in a separate case (not shown) which is supported below the pack. The radio case is demountably attached to the pack by means of mounting plates 14 riveted to either end of the base 10 and having U-shaped flanges 14a adapted slidably to engage similar flanges at the upper corners of the radio case.

The cover 12 is in the form of a generally cubical box open at its lower end and with its lower edge resting on the upper surface of the base 10. Both the cover 12 and base 10 may suitably be molded from a plastic material, such as a laminated phenolic, so that they are strong, light in weight and may be fabricated inexpensively. The cover 12 advantageously may be tapered slightly toward its upper end to facilitate molding in a single piece. This tapering also facilitates discharge of the parachute from the cover.

The base 10 is molded in two pieces, being identical upper and lower halves, which are secured together by the riveted end plates 14 and by a rivet 18 (Figures 3 and 4) extending through flanges 19 projecting from the center of the adjacent edges of the upper and lower halves. The front side of the base 10 is closed by a sliding door 20 the upper and lower edges of which are supported in channels 22 formed in the front edges of the upper and lower halves of the base. The sliding door 20 is normally held in closed position by means of a spring detent 24, the center of which is riveted to the outer surface of the door and the upper and lower ends of which project into notches 26 formed in the front edges of the upper and lower halves of the base 10.

As shown particularly in Figure 4, the lower rear edge of the cover 12 is held down against the base 10 by a link 28 at the center of the case. The lower end of this link 28 is secured beneath the aforementioned rivet 18, and it extends upwardly and is curved so that its upper end is engaged in a recess formed in the upper surface of a flange 30 projecting from the center of the lower rear edge of the cover 12. The link 28 is made of a spring material which is stiff enough to hold the rear edge of the cover 12 down against the anticipated forces tending to separate them, while permitting the shell to pivot open about its rear corner, as illustrated in Figure 7.

The cover 12 is urged toward open position by a pair of leaf springs 32 (Figure 3) at the rear side of the case. As may be seen in Figure 5, the springs 32, when in relaxed condition, are curved generally arcuately. The ends of the spring are provided with notches 32a which engage headed studs 34 projecting from the rear face of the base 10 and of the cover 12, with the springs being bent into generally straight-line conformation. The springs 32 thus impose on the heads of the studs 34 an outward pressure tending to cause the cover 12 to pivot about its lower rear edge to open position as shown in Figure 7.

The cover 12 is normally held in closed position, as illustrated in Figure 1, against the force of the springs 32, by means of a time delay assembly, generally designated 36. This time delay assembly 36 includes an outer cylindrical tube 38 closed at its lower end by a base plug 40 and at its upper end by a screw cap 42. Interposed between the upper end of the tube 38 and the screw cap 42 is a bracket 44 having an opening therein to receive the male threaded end of the cap 42, as best shown in Figure 6. The two ends of the bracket 44 are secured to the upper surface of the cover 12 by rivets 46. The lower end of the locking assembly is tied to the base 10 of the pack by a cord 48 which extends through openings 50 at either side of the tube 38, and through openings 52 in the upper surface of the base 10, with the ends of the cord within the base 10 being tied together to form a closed loop. This holds the lower front edge of the cover 12 down tightly against the upper surface of the base 10 until the cord 48 is severed by the time delay mechanism which is shown in detail in Figure 6.

As may be seen in this figure, the time delay mechanism includes a firing pin 54 having an elongated shank 56 extending through an opening in the upper end of the screw cap 42 with an enlarged, bell-shaped head 58 formed at its outwardly projecting end. The firing pin 54 is urged downwardly by a coil spring 59 which surrounds the shank 56 of the firing pin and is received in a recess 60 in the cap 42. The spring 59 is compressed between the enlarged head 62 at the lower end of the firing pin and the upper end wall of the recess 60.

The firing pin 54 is normally held in its upper or cocked position, as illustrated in Figure 6, against the force of the spring 59 by a generally U-shaped spring clasp 64, one end of which is notched to receive the shank 56 of the firing pin, with this end of the clasp 64 interposed beneath the bottom of the enlarged head 58 of the firing pin and the upper surface of the cap 42. The opposite end of the clasp 64 is provided with an opening which fits over the rounded upper end of the head 58 of the firing pin, and is normally prevented from moving off the head by a safety cotter pin 66 which is received through an opening in the upper end of the head 58. This keeps the lower leg of the clasp in locking engagement with the firing pin.

When the cotter pin 66 is removed, the spring clasp 64 may be pulled off the head 58 by pulling a static line 68 secured thereto. This results in resiliently springing apart the two legs of the clasp 64 to permit the upper leg to be cammed over the outer end of the head 58, and to remove the lower leg from beneath the head 58, releasing the firing pin for downward movement by the spring 59.

Beneath the firing pin 54, in position to be struck thereby, is a percussion cap 70, swaged in the upper end of a cylindrical fuse plug 72 which is slidably received in the tube 38 and held in proper longitudinal position therein by a set screw 74 threaded through the tube 38 and projecting into an annular groove 76 extending around the central portion of the fuse plug 72. The fuse plug 72 is provided with a cylindrical bore 78 forming a fuse chamber which is closed at its upper end by a screw cap 80 in which the percussion cap 70 is mounted. This chamber 78 is filled with a combustible material which is ignited at the upper end of the chamber when the percussion cap 70 is struck by the firing pin 54.

It requires a finite time, for example of the order of 5 or 10 seconds, depending upon the time delay desired, for the combustible material in the fuse chamber 78 to burn all the way to the bottom of the chamber. When this happens, the main powder charge 84 is ignited through an opening 82 in the lower end of the fuse chamber. This main powder charge 84 is contained within the hollow bore of a projectile 86 which is force fitted on the lower end of the fuse plug and which is axially bored out at its lower end to form a relatively sharp peripheral cutting edge 88.

When the main powder charge is detonated, the projectile 86 is fired down against the base plug 40 at the lower end of the tube 38. As the projectile 86 passes the cord 48, the cord is severed by the cutting edge 88, thereby releasing the front edge of the cover 12. This permits the springs 32 to peel back the cover, as illustrated in Figure 7. A spring (not shown) at the closed upper end of the cover 12 may be provided to eject the parachute from the cover and a pilot parachute may be provided to facilitate release and opening of the main parachute. The main parachute is attached by means of an elongated rope 90 (Figure 7) to a U-bolt 92 which extends through the base 10 and is secured by nuts 94 at the under surface of the base 10. The rope 90 includes a wire conductor which serves as the antenna for the radio equipment.

When the cover 12 moves to its open position, the upper end of the link 28 is disengaged from the flange 30 on the lower rear edge of the cover and the cover is entirely freed from the base 10.

In use, the safety cotter pin 66 is removed from the time delay assembly 36 and the parachute pack and its attached radtio equipment are placed in an airlock chamber communicating through a hatch with the bottom of the airplane, with the static line 68 attached to the airframe. The equipment is dropped by merely opening the hatch. When the pack falls to the point where the static line 68 is extended to its full length, the spring clasp 64 is pulled from the firing pin 54, allowing the firing pin to strike the percussion cap 70 and ignite the combustible material in the fuse chamber. After a predetermined time interval, the main powder charge is detonated, firing the projectile 86 and severing the cord 48 to permit the springs 32 to open the parachute case and release the parachute.

From the foregoing description, it will be understood that the parachute pack which is shown and described herein is simple and inexpensive in construction and yet is reliable in operation. It will thus be appreciated that the foregoing aforementioned and other desirable objects have been achieved. However, it should be emphasized that the particular embodiment of the invention which is shown and described herein is intended as merely illustrative rather than as restrictive of the invention.

I claim:

1. In a parachute container of the type including a base, a hollow, substantially rigid shell open at one end and adapted to enclose a parachute, the edge of said shell around said open end being in closing contact with said base, a link mounted on a first side of said container and normally holding said shell against said base at said side and constituting a fulcrum about which said shell can pivot to uncover said open end, and releasable fastening means operatively associated with another side of said container and normally holding said shell against pivotal movement relative to said base, the combination therewith of an improved opening means comprising leaf spring means mounted at the outer face of said first side of said container, opposite end portions of said leaf spring means respectively engaging said base and said shell and urging said shell to pivot about said fulcrum relative to said base, at least one of said end portions being shaped to slip readily from engagement with the adjacent portion of said container after opening thereof.

2. In a parachute container of the type including a base, a hollow, substantially rigid shell open at one end and adapted to enclose a parachute, the edge of said shell around said open end being in closing contact with said base, a link mounted on a first side of said container and normally holding said shell against said base at said side and constituting a fulcrum about which said shell can pivot to uncover said open end, and releasable fastening means operatively associated with another side of said container and normally holding said shell against pivotal movement relative to said base, an improved opening means comprising normally curved leaf spring means stressed from said normally curved shape into a more nearly straight shape, and hook-like members projecting from the outer face of said first side of said container, with the opposite ends of said spring means hooked behind said hook-like members to impose a force tending to cause said shell to pivot about said fulcrum relative to said base, said ends of said spring means being withdrawable from said hook-like members upon opening of said container.

3. In a delayed opening parachute container of the type including a base, a hollow, substantially rigid shell open at one end and adapted to enclose a parachute, the edge of said shell around said open end being in closing contact with said base, a link mounted on a first side of said container and normally holding said shell against said base at said side and constituting a fulcrum about which said shell can pivot to uncover said open end, releasable fastening means operatively associated with another side of said container and normally holding said shell against pivotal movement relative to said base, and timing means for releasing said releasable fastening means a predetermined time interval after actuation of said timing means.

References Cited in the file of this patent

UNITED STATES PATENTS

| | | |
|---|---|---|
| 1,264,050 | Fuji | Apr. 23, 1918 |
| 1,296,736 | Austin | Mar. 11, 1919 |
| 1,755,414 | Smith | Apr. 22, 1930 |
| 1,777,188 | Wiley | Sept. 30, 1930 |
| 2,058,822 | Petter | Oct. 27, 1936 |
| 2,581,645 | Frieder | Jan. 8, 1952 |

FOREIGN PATENTS

| | | |
|---|---|---|
| 734,695 | France | Aug. 8, 1932 |